March 17, 1953     R. J. GELBMANN     2,632,120
APPARATUS FOR STARTING INTERNAL-COMBUSTION
ENGINES FROM A DISTANCE
Filed April 2, 1952
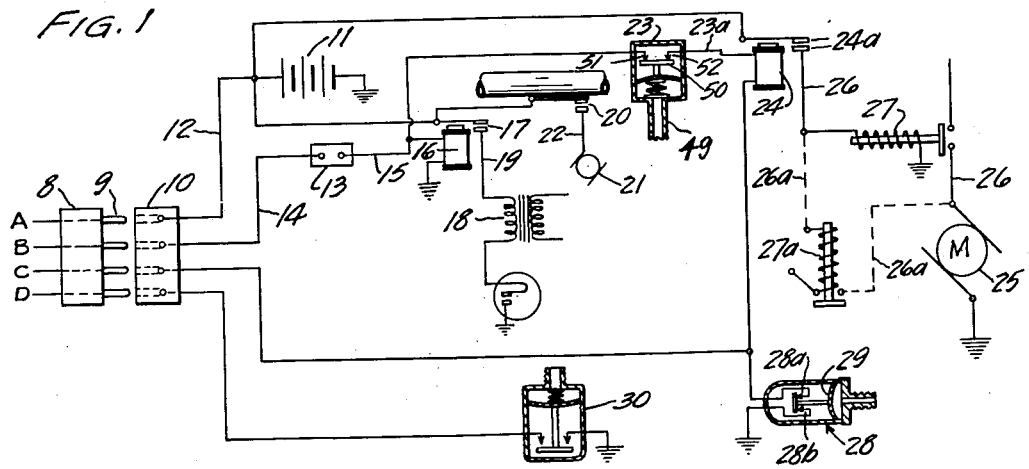
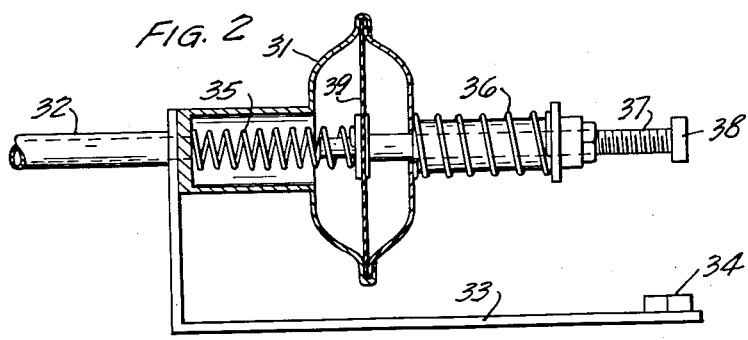
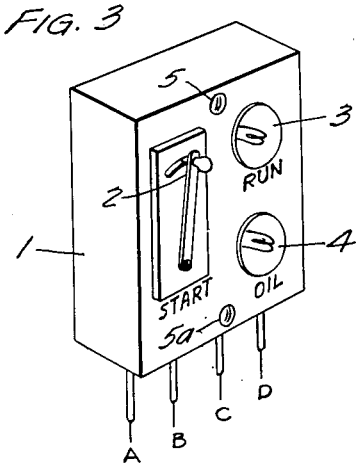
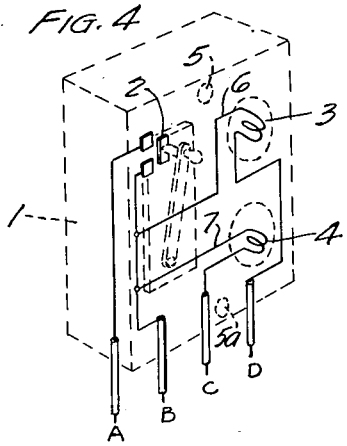
INVENTOR
RICHARD J. GELBMANN
BY Mark W. Gehan
ATTORNEY Patented Mar. 17, 1953

2,632,120

UNITED STATES PATENT OFFICE 2,632,120

APPARATUS FOR STARTING INTERNAL-COMBUSTION ENGINES FROM A DISTANCE

Richard J. Gelbmann, St. Paul, Minn.

Application April 2, 1952, Serial No. 280,139

4 Claims. (Cl. 290—38)

This invention relates to an apparatus for starting and stopping an internal combustion engine at a distance therefrom.

More particularly the apparatus is adapted to start the engine of an automobile parked within a garage a distance from the residence of the owner of the automobile.

It is of course a well-known fact that by starting the engine of an automobile in advance of the time it is actually to be used, and permitting the engine to idle for a length of time, the various working parts of the engine are heated gradually, and this helps to conserve the engine and preserve the same against breakdown. The above mentioned desirability of first warming an automobile engine is particularly desirable when the automobile is being used in cold weather, such as is present in large areas of the United States during certain times of the year. By use of the apparatus of this invention, it is conveniently made possible for the owner of an automobile to start the engine of his automobile in his garage without having to venture out into the cold to do so.

The apparatus of this invention may be used in connection with automobiles having either an automatic transmission, or a conventional transmission. The apparatus, as presently designed, may be used only on automobiles having a solenoid operated starter. The apparatus is particularly adapted to be used on automobiles having an automatic choke, but may be used on automobiles having a manual choke if no choking is needed to start the car.

An object of the invention is to provide a remote control starting apparatus for automobiles which will not require any solenoid switches (apart from those forming a part of the automobile itself) and which will require only inexpensive, easy to manufacture parts in its construction. It is further an object to provide an apparatus as above described which can be put up in a conveniently sized package, to be sold, as a kit, in automotive supply stores, etc. It is also an objective to provide a remote control starting apparatus which can be easily installed by the average motorist, having no particular mechanical ability.

It is also an objective to provide in such apparatus a visual indication (conveniently in the form of an incandescent light) to the motorist to advise him, in his house, if oil pressure is present in his engine. Thus, by means of such visual indication, he will be advised that he should stop his engine, if oil pressure is not present therein.

A further object of this invention is to provide an apparatus as above described which is adaptable to all cars (having a solenoid operated starter) and which is simple to operate.

A further object and advantage is to provide an apparatus which operates entirely off the automobile battery, no external source of current being needed. This is advantageous both for the safety factor, and because the apparatus, requiring only such low power, can, under the law, be installed by a person other than a licensed electrician.

A particular advantage in the apparatus of this invention is that it will serve to automatically start the automobile, if that automobile could be started manually, by the operator going out to it for the purpose. In other words, this apparatus will function just as effectively as a human operator in starting the engine of an automobile.

A further advantage of the invention is that it causes very little drain on the automobile battery to operate the apparatus; not over three amperes more than would be taken by the regular system.

A further advantage in the apparatus of this invention is that the speed at which the automobile engine runs (in the garage or other point remote from the operator), may be reduced as the engine warms up, to conserve gasoline, etc. By reason of using a novel element hereinafter particularly described, the automobile engine may first be started to run at fast idle speed, and thereafter as it warms up, be reduced to run at curb idle speed, for example.

A further advantage of this apparatus is that the automobile heater may be connected thereto to turn on and warm the automobile when the apparatus is put in operation, and the engine of the car has reached a pre-determined heat.

Referring now to the drawings accompanying the application:

Figure 1 is a diagrammatic lay-out of the circuit employed in the apparatus.

Figure 2 is a cross-section of a vacuum operated element for opening the throttle on the engine.

Figure 3 is an external view of the control box whereby the apparatus is put into operation.

Figure 4 is an internal view of the control box of Figure 3.

Figure 5 is a view of a weatherproof loom, enclosing four vari-colored wires.

It should of course be understood that the particular embodiments shown in the drawings and hereinafter described are intended to be wholly illustrative in character and that I do not intend to limit myself to the particular things shown since numerous modifications of the apparatus are possible without departing from the inventive concept thereof.

Referring now to the drawings in greater detail, reference character 1 (in Figure 3) indicates generally a control box whereby the apparatus of this invention is put into operation. Said control box is provided with starting switch 2, which may be of any conventional type, indicator lights 3 and 4, and mounting screws 5 and 5a, for mounting said control box at some convenient place and height. Indicator light 3, comprising an incandescent bulb, is connected to switch 2 by conductor 6, and will light up when the apparatus of this invention has caused the automobile engine to begin running. Indicator light 4, also connected to switch 2 by conductor 7, will light as soon as switch 2 is closed. This light 4 will remain lighted until the oil pressure in the automobile engine reaches a pre-determined pressure, whereupon light 4 will go out.

Extending out from the bottom of control box 1 are the circuit wires therein, namely, wires A, B, C and D. The outer wrapping of each of these wires is a distinctive color, so that the proper wire may be matched, color by color, to the wires within weatherproof loom 8, shown in Figure 5 of the drawing.

The length of weatherproof loom 8 which will be needed, will, of course, depend upon the distance at which the automobile is located from the control box.

Referring now to Figure 1 of the drawings, a plug-in connector is indicated at reference character 9. Said plug-in connector is affixed to the end of the length of weatherproof loom 8. Plug-in connector 9 is intended for insertion into female connector 10, which is mounted on any convenient place upon the automobile. Wire A, in loom 8, is connected to automobile battery 11 by means of conductor 12. Battery 11 is the standard automobile battery. It is this battery which operates the whole apparatus of this invention, no external source of power being required. Wire B within loom 8 is connected to neutral safety switch 13 by conductor 14. Safety switch 13 is provided only if the automobile has a conventional (as distinguished from an automatic) transmission. It is a mechanical switch which will allow current to pass only if the gear selector within the automobile is in position to put the automobile gears in neutral. Thus, if the gear shift has been left in low or second gear, current will not pass through switch 13, and the engine of the automobile will not be started by the apparatus. Switch 13 provides a safety factor so that the automobile will not start, and thus move forwardly or rearwardly with no one in attendance, should the motor accidentally be left in gear.

If the automobile upon which the apparatus is being used is of the automatic transmission type, a safety switch similar to switch 13, is provided as a standard part of the automobile. In such case, the apparatus of this invention is wired through that safety switch, and an additional safety switch is not necessary. From switch 13 current passes, through conductor 15, to single relay 16. This relay 16 closes a set of points 17 and sends current directly to the automobile ignition coil 18 through conductor 19.

Reference character 20 indicates a thermo-statically operated switch, mounted on or near the exhaust manifold of the automobile. As the automobile engine warms up, heat from the exhaust manifold causes the points in this switch to close and send current directly to the heater motor 21 through conductor 22.

Reference character 23 indicates a vacuum switch which will pass current until vacuum is applied. This switch allows current to flow along conductor 23a through relay 24, thus energizing the starting motor 25, through conductors 26 or 26A and starter solenoids 27 and 27A.

Switch 23 is tapped off the intake manifold through hose 49. Said switch is provided with a spring loaded plate 50 which abuts on two points 51 and 52, to complete the circuit. When the engine is started, the vacuum thereof in the intake manifold operating through hose 49 retracts spring loaded plate 50 in switch 23, thereby breaking off the flow of current to the relay 24. As long as the automobile engine is running plate 50 will remain retracted, and thereby interrupt the flow of current.

Single relay 24 is shown as being grounded through oil pressure switch 28. By grounding this relay in such manner, an additional safety factor is provided in the event switch 23 should not operate for some reason to break the flow of current in the manner above stated, and thus deenergize the starting motor. In such case, then switch 28, when the engine starts, would function to break the current and shut off the starting motor. Relay 24 closes a set of points 24A, thus sending current directly from the battery to the starter solenoid 27 or 27A. Starter solenoid 27 is the type where the battery current is applied to energize the solenoid. Starter solenoid 27A is of the design whereby a ground wire is required to energize the solenoid. The proper wiring for solenoid 27 is shown by lines 26, whereas the proper wiring for solenoid 27A is shown by dotted lines 26A.

Both types of solenoid, 27 and 27A, function to close the starting circuit and pass current directly to the starting motor of engine 25.

Switch 28 is a ground when the automobile engine is not running, and up until the time the oil pressure builds up to the pre-determined pressure, whereupon the switch contacts 28a and 28b open and break the circuit to indicator light 4 through wire C, thereby causing indicator light 4 to go off, thus indicating to the operator in the house that proper lubrication is taking place. Switch 28 is teed on to the main oil line (not shown), and the oil in that line acts upon a diaphragm 29 in said switch to move the same and open contacts 28a and 28b.

Switch 30 is very similar to switch 23, and, like switch 23, is also operated off the intake manifold. Switch 30, however, remains in open position until the engine starts, whereas switch 23 remains in closed position until the engine starts. When the automobile engine starts, the vacuum in the intake manifold closes switch 30, and grounds light 3 through wire D.

Referring now particularly to Figure 2 of the drawings, reference character 31 indicates generally a vacuum operated element for opening the throttle when the engine of the automobile is shut off. This device 31 operates off the intake manifold, being attached thereto by hose 32, and being mounted by bracket 33 to carburetor mounting stud 34. The particular shape of bracket 33 will depend upon, and vary with, the make and model of automobile upon which the apparatus is being installed. Vacuum operated element 31 is entirely separate from, and has no electrical or other connection with the apparatus shown in Figure 1 of the drawings. Element 31 comprises a spring-loaded vacuum diaphragm. When the automobile engine is shut off internal spring 35 and external spring 36 urge push rod 37, bearing head 38, against a convenient extension on the throttle assembly. Most commonly, but not in all cases, this extension will be the "unloader" on the carburetor. The purpose of element 31 is to allow the fast idle cam to drop into position as the choke closes. When the automobile engine is started, the vacuum from the intage manifold, applied through hose 32, causes diaphragm 39 to be pulled against the pressure of springs 35 and 36, thereby retracting push rod 37, and allowing the throttle assembly to drop against some step on the fast idle cam. The particular step on the fast idle cam against which the throttle assembly will drop is determined by the coldness of the weather, and the thermostatic setting of the automatic choke on the automobile.

As the automobile engine warms up, and the choke opens, the throttle assembly will remain on the same step of the fast idle cam, but may be caused to rest on a lower step of said cam (thus causing the automobile motor to run at a lower speed) by opening switch 2 and de-energizing the apparatus. When this happens, the automobile engine is shut off, and push rod 37 moves forward, contacting the throttle assembly to push it forward and allow the fast idle cam to drop to a lower step.

Upon restarting of the automobile engine, by again closing switch 2, the engine vacuum again causes push rod 37 to be retracted, whereupon the engine idles at a slower speed.

The apparatus of this invention is operated in the following manner, in summary. When the automobile is parked in the garage, with the transmission selector in neutral (since safety switch 13 will not allow the engine to crank if it is left in gear), the four socket connector 9 is inserted into female connector 10. At that time it is advisable to connect a flexible hose from the exhaust pipe of the automobile to a point outside the garage, so that when the automobile engine starts, the exhaust vapors will be transported to the outdoors. When the car is to be started switch 2 in the control box 1 is closed. This energizes relay 16 which sends current to coils 18. At the same time it energizes another relay 24 which operates the automobile started 25. When the automobile starts, a vacuum switch 23 interrupts the current to the starter relay 24, and the starter becomes inoperative.

While the specific details have been herein shown and described, the invention is not confined thereto, as changes and alterations may be made without departing from the spirit of the invention. Having fully described my invention, what I claim as new and desire to secure by Letters Patent is:

1. A device for automatically cranking an internal combustion engine having a throttle assembly, an intake manifold, an electrically operated started motor, and an ignition coil, said device comprising manually operated switch means remote from said engine, a plurality of indicator lights adjacent said manually operated switch means, a storage battery power source, normally open electrical connections from said power source to said starter motor and to said ignition coil, a plurality of relays in circuit with said power source and activatable by said switch means whereby said normally open electrical connections may be closed for energizing said starter motor and ignition coil, two vacuum switch means adapted for operation by vacuum in said intake manifold, the first of said switch means functioning to de-energize said starter motor when said engine starts, the second of said switch means functioning to ground one of said indicator lights when said engine starts, switch means adapted for operation by engine oil pressure to break a circuit to another of said indicator lights, and a throttle opening element including a vacuum operated diaphragm with a spring impelled push rod affixed thereto, said element being mounted adjacent said throttle assembly to provide for said push rod to bear against and open said throttle assembly, said element being provided with such connection to said intake manifold that engine vacuum will operate on said diaphragm to retract same and said push rod, said push rod thereby being withdrawn from contact with said throttle assembly when said engine is in operation.

2. Apparatus for automatically cranking an automobile engine having an ignition system and an electrically operated starter motor, said device incorporating means to indicate at a distance from said engine operation thereof and oil pressure therein, said apparatus also incorporating an engine speed-reducing element, said apparatus comprising switch control means remote from said engine, indicator lights adjacent said switch control means, a storage battery power source, a normally open electrical circuit from said power source to said starter motor, a normally open electrical circuit from said power source to said ignition system, magnetic relay devices in circuit with said power source and energizable by said switch control means for closing said circuits to said starter motor and ignition system, switch means adapted for operation by engine vacuum to open said circuit from said power source to said starter motor to de-energize said starter motor when said engine begins to operate, switch means adapted for operation by engine vacuum to ground an indicator light when said engine starts, and switch means adapted for operation by engine oil pressure to break a circuit to an indicator light; said engine speed-reducing element comprising a throttle opening element including a vacuum operated diaphragm with a spring impelled push rod affixed thereto, said element being mounted adjacent the engine throttle assembly to provide for said push rod to bear against and open said throttle assembly, said element being adapted to operate by engine vacuum for retraction of said vacuum diaphragm and said push rod.

3. A remote control apparatus for starting an internal combustion engine having an electrical ignition system, an electrically operated starter motor, and an electrical power source, said apparatus comprising switch control means, a starter motor control circuit and an ignition circuit each having normally open contact points, a plurality of relays in circuit with said power source for closing said normally open contact points upon operation of said switch control means to permit the flow of energy to said starter motor and ignition system, switch means adapted for operation by engine vacuum to open starter motor control circuit when said engine begins to operate, switch means in circuit with an incandescent bulb and adapted for operation by engine vacuum to ground said incandescent bulb when said engine commences operation, and switch means in circuit with an incandescent bulb and adapted for operation by engine oil pressure to break said circuit with said incandescent bulb when said oil pressure reaches a pre-determined level; and a throttle opening element including a vacuum operated diaphragm with a spring impelled push rod affixed thereto, said element being mounted adjacent the engine throttle assembly to provide for said push rod to bear against and open said throttle assembly, said element being adapted to operate by engine vacuum for retraction of said vacuum diaphragm and said push rod, said push rod being retracted from contact with said throttle assembly when said engine is in operation.

4. A remote control apparatus for starting an internal combustion engine comprising an electrical power source, switch control means, a starter motor control circuit embodying a first set of contacts and a second set of contacts, said first set of contacts being controlled by a magnetic relay energizable by said switch control means to permit the flow of current to the engine starter motor, said second set of contacts being controlled by engine vacuum to break said starter motor control circuit when said engine begins to operate, an ignition circuit embodying a set of contacts controlled by a magnetic relay energizable by said switch control means to permit the flow of current to the engine ignition system, an indicator light in circuit with a switch controlled by engine vacuum, said switch grounding said light when said engine is in operation, a second indicator light in circuit with a switch controlled by engine oil pressure, said switch operating to break said circuit when pre-determined oil pressure is attained, and a throttle opening element including vacuum operated diaphragm with a spring impelled push rod affixed thereto, said element being mounted adjacent the engine throttle assembly to provide for said push rod to bear against said open throttle assembly, said element being adapted to operate by engine vacuum for retraction of said vacuum diaphragm and said push rod, said push rod thereby being retracted from contact with said throttle assembly when said engine is in operation.

RICHARD J. GELBMANN.

REFERENCES CITED

The following references are of record in the file of this patent:

UNITED STATES PATENTS

| Number | Name | Date |
|---|---|---|
| 1,137,519 | Newburger | Apr. 27, 1915 |
| 1,776,683 | Larkin | Sept. 23, 1930 |
| 2,098,549 | Luke | Nov. 9, 1937 |
| 2,367,960 | Parfitt | Jan. 23, 1945 |
| 2,423,464 | Moncrief | July 8, 1947 |
| 2,450,904 | Moncrief | Oct. 12, 1948 |
| 2,544,955 | Harrelson | Mar. 13, 1951 |
| 2,591,618 | Schaeffer | Apr. 1, 1952 |
| 2,607,013 | Drummond | Aug. 12, 1952 |

OTHER REFERENCES

Popular Mechanics, June 1915, page 831.